(12) United States Patent
Pandya et al.

(10) Patent No.: US 9,359,545 B2
(45) Date of Patent: Jun. 7, 2016

(54) BRANCHED VISCOELASTIC SURFACTANT FOR HIGH-TEMPERATURE ACIDIZING

(71) Applicant: HALLIBURTON ENERGY SERVICES, INC., Houston, TX (US)

(72) Inventors: Nisha Kaustubh Pandya, Pune (IN); Sushant Dattaram Wadekar, Mumbai (IN); Ganesh Surykant Pathre, Mumbai (IN)

(73) Assignee: Halliburton Energy Services, Inc., Houston, TX (US)

( * ) Notice: Subject to any disclaimer, the term of this patent is extended or adjusted under 35 U.S.C. 154(b) by 422 days.

(21) Appl. No.: 13/784,105

(22) Filed: Mar. 4, 2013

(65) Prior Publication Data

US 2014/0246198 A1    Sep. 4, 2014

(51) Int. Cl.
*E21B 43/22* (2006.01)
*C09K 8/74* (2006.01)
*E21B 43/26* (2006.01)

(52) U.S. Cl.
CPC .. *C09K 8/74* (2013.01); *E21B 43/26* (2013.01)

(58) Field of Classification Search
CPC ........ C09K 2208/30; C09K 8/68; C09K 8/74; C09K 8/602; C09K 8/584; C09K 8/72; E21B 43/26; E21B 43/16; E21B 37/06; E21B 43/25
See application file for complete search history.

(56) References Cited

U.S. PATENT DOCUMENTS

| 7,119,050 | B2 | 10/2006 | Chang et al. |
| 7,994,099 | B2 | 8/2011 | Cassidy et al. |
| 8,017,567 | B2 | 9/2011 | Schmit et al. |
| 2010/0230106 | A1 | 9/2010 | Milne et al. |
| 2011/0017457 | A1 | 1/2011 | Samuel et al. |
| 2011/0152135 | A1 | 6/2011 | Chen et al. |
| 2011/0284228 | A1 | 11/2011 | Huang et al. |

OTHER PUBLICATIONS

Product Information of Mackernium CC-112P9, INCI Name: Isostearamidopropyl ethyldimonium ethosulfate, 2011.
International Search Report and Written Opinion issued in related PCT Application No. PCT/US2014/010005 mailed Apr. 23, 2014, 12 pages.
Welton, Thomas D. et al., "High Viscosity Yield Acid Systems for High-Temperature Stimulation," SPE 98237, 2006 Society of Petroleum Engineers (SPE) International Symposium and Exhibition on Formation Damage Control held in Lafayette, LA, Feb. 15-17, 2006, pp. 1-8.
Nasr-El-Din, H.A. et al., "Application of Cationic Surfactant-Based Fluids for Acid Diversion," SPE 107687, European Formation Damage Conference, Scheveningen, The Netherlands, May 30-Jun. 1, 2007, SPE Production & Operations, Feb. 2009, pp. 124-134.
R. Shankar Subramanian, "Non-Newtonian Fluids," Department of Chemical and Biomolecular Engineering, Clarkson University, http://web2.clarkson.edu/projects/subramanian/ch330/notes/Non-Newtonian%20Flows.pdf, 5 pages.
International Preliminary Report on Patentability issued in related PCT Application No. PCT/US2014/010005, mailed Sep. 17, 2015 (12 pages).

*Primary Examiner* — Zakiya W Bates
(74) *Attorney, Agent, or Firm* — Holly Soehnge; Baker Botts L.L.P.

(57) ABSTRACT

A treatment fluid for use in a subterranean formation penetrated by the wellbore of a well includes: (i) water; (ii) a strong acid; and (iii) a branched viscoelastic surfactant having a hydrophobic portion with a total of 16 to 20 carbons; wherein the pH of the treatment fluid is less than 0.5; and wherein the viscosity of the treatment fluid is less than 5 cP at 40 sec-1. A method of treating a zone of a subterranean formation penetrated by a wellbore includes the steps of; (A) forming the treatment; (B) introducing the treatment fluid through the wellbore into the zone; and (C) allowing time for the strong acid in the treatment fluid to spend in the formation.

14 Claims, 9 Drawing Sheets

Figure 1 Isostearamidopropyl ethyldimonium ethosulfate

BRANCHED VISCOELASTIC SURFACTANT FOR HIGH-TEMPERATURE ACIDIZING

TECHNICAL FIELD

The inventions are in the field of producing crude oil or natural gas from subterranean formations. More specifically, the inventions relate to increasing the viscosity of a well fluid for acidizing a subterranean formation, for example, matrix or fracture acidizing of carbonate formations, leak-off control in acid fracturing, and diversion in matrix acidizing.

BACKGROUND

Oil & Gas Wells

To produce oil or gas from a reservoir, a well is drilled into a subterranean formation, which may be the reservoir or adjacent to the reservoir. Typically, a wellbore of a well must be drilled hundreds or thousands of feet into the earth to reach a hydrocarbon-bearing formation.

It is desirable to extend the production of wells and to avoid early abandonment when productivity decreases as a result of low natural permeability or formation damage.

Well Servicing and Well Fluids

Well services can include various types of treatments that are commonly performed in a wellbore or subterranean formation. For example, stimulation is a type of treatment performed to enhance or restore the productivity of oil or gas from a well. Even small improvements in fluid flow can yield dramatic production results.

Stimulation treatments fall into two main groups: hydraulic fracturing and matrix treatments. Fracturing treatments are performed above the fracture pressure of the subterranean formation to create or extend a highly permeable flow path between the formation and the wellbore. Fracturing treatments are often applied in treatment zones having poor natural permeability. Matrix treatments are performed below the fracture pressure of the formation. Matrix treatments are often applied in treatment zones having good natural permeability to counteract damage in the near-wellbore area.

Hydraulic Fracturing

The purpose of a hydraulic fracturing treatment is to provide an improved flow path for oil or gas to flow from the hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Usually, but not in all applications, a proppant should not melt, dissolve, or otherwise degrade from the solid state under the downhole conditions.

Acidizing

The purpose of acidizing is to dissolve acid-soluble materials. A treatment fluid including an aqueous acid solution is introduced into a subterranean formation to dissolve the acid-soluble materials. In this way, oil or gas can more easily flow from the formation into the well. In addition, an acid treatment can facilitate the flow of injected treatment fluids from the well into the formation.

Acidizing techniques can be carried out as acid fracturing procedures or matrix acidizing procedures.

In acid fracturing, an acidizing fluid is pumped into a formation at a sufficient pressure to cause fracturing of the formation and to create differential (non-uniform) etching of fracture conductivity. Depending on the rock of the formation, the acidizing fluid can etch the fractures faces, whereby flow channels are formed when the fractures close. The acidizing fluid can also enlarge the pore spaces in the fracture faces and in the formation.

In matrix acidizing, an acidizing fluid is injected from the well into the formation at a rate and pressure below the pressure sufficient to create a fracture in the formation.

Acidizing Sandstone or Carbonate Formations

Acidizing is commonly performed in sandstone and carbonate formations, however, the different types of formations can require that the particular treatments fluids and associated methods be quite different.

For example, sandstone formations tend to be relatively uniform in composition and matrix permeability. In sandstone, a range of stimulation techniques can be applied with a high degree of confidence to create conductive flow paths, primarily with hydraulic fracturing techniques, as known in the field.

In sandstone formations, acidizing primarily removes or dissolves acid soluble damage in the near-wellbore region. Thus, in sandstone formations acidizing is classically considered a damage removal technique and not a stimulation technique. An exception is with the use of specialized hydrofluoric acid compositions, which can dissolve the siliceous material of sandstone.

Carbonate formations tend to have complex porosity and permeability variations with irregular fluid flow paths. Although many of the treatment methods for sandstone formations can also be applied in carbonate formations, it can be difficult to predict effectiveness for increasing production in carbonate formations.

In carbonate formations, the goal is usually to have the acid dissolve the carbonate rock to form highly-conductive fluid flow channels in the formation rock. These highly-conductive channels are called wormholes. In acidizing a carbonate formation, calcium and magnesium carbonates of the rock can be dissolved with acid. A reaction between an acid and the minerals calcite ($CaCO_3$) or dolomite ($CaMg(CO_3)_2$) can enhance the fluid flow properties of the rock.

In carbonate reservoirs, hydrochloric acid (HCl) is the most commonly applied stimulation fluid. Organic acids such as formic or acetic acid are used mainly as retarded-acid systems or in high-temperature applications. Stimulation of carbonate formations usually does not involve hydrofluoric acid, however, which is difficult to handle and commonly only used where necessary, such as in acidizing sandstone formations.

Greater details, methodology, and exceptions regarding acidizing can be found, for example, in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, and the references contained therein.

Problems with Acid Fracturing

When the acid is injected above the fracture pressure of the formation being treated, the treatment is called acid fracturing or fracture acidizing. The object is to create a large fracture that serves as an improved flowpath through the rock formation. After such fractures are created, when pumping of the fracture fluid is stopped and the injection pressure drops, the fracture tends to close upon itself and little or no new flow path is left open after the treatment. Commonly, a proppant is added to the fracturing fluid so that, when the fracture closes, proppant remains in the fracture, holds the fracture faces apart, and leaves a flow path conductive to fluids. In addition to or alternatively to propping, an acid may be used as a component of the fracturing fluid. Depending on the rock of the formation, the acid can differentially etch the faces of the fracture, creating or exaggerating asperities, so that, when the fracture closes, the opposing faces no longer match up. Consequently they leave an open pathway for fluid flow.

A problem with this technique is that as the acid is injected it tends to react with the most reactive rock or the rock with which it first comes into contact. Thus, much of the acid is used up near the wellbore and is not available for etching of the fracture faces farther from the wellbore.

In addition, the acidic fluid follows the paths of least resistance, which are for example either natural fractures in the rock or areas of more permeable or more acid-soluble rock. Depending on the nature of the rock formation, this process can create long branched passageways in the fracture faces leading away from the fracture, usually near the wellbore. These highly conductive micro-channels are called "wormholes" and are very deleterious because subsequently-injected fracturing fluid tends to leak off into the wormholes rather than lengthening the desired fracture. To block the wormholes, techniques called "leak-off control" techniques have been developed. This blockage should be temporary, however, because the wormholes are preferably open to flow after the fracturing treatment; oils or gas production through the wormholes adds to total production.

Problems with Matrix Acidizing

When an acidic fluid is used to stimulate a substantially acid-soluble formation below the fracturing pressure, the treatment is called matrix acidizing. Studies have shown that the dissolution pattern created by the flowing acid occurs by one of three mechanisms (a) compact dissolution, in which most of the acid is spent near the wellbore rock face; (b) wormholing, in which the dissolution advances more rapidly at the tips of a small number of wormholes than at the wellbore walls; and (c) uniform dissolution, in which many pores are enlarged. Compact dissolution occurs when acid spends on the face of the formation. In this case, the live acid penetration is commonly limited to within a few centimeters of the wellbore. Uniform dissolution occurs when the acid reacts under the laws of fluid flow through porous media. In this case, the live acid penetration will be, at most, equal to the volumetric penetration of the injected acid. (Uniform dissolution is also the preferred primary mechanism of conductive channel etching of the fracture faces in acid fracturing, as discussed above.) The objectives of the matrix acidizing process are met most efficiently when near wellbore permeability is enhanced to the greatest depth with the smallest volume of acid. This occurs in regime (b) above, when a wormholing pattern develops.

However, just as wormholing prevents the growth of large fractures, wormholing prevents the uniform treatment of long zones of a formation along a wellbore. Once wormholes have formed, at or near a point in the soluble formation where the acid first contacts the formation, subsequently-injected acid will tend to extend the existing wormholes rather than create new wormholes further along the formation. Temporary blockage of the first wormholes is needed so that new wormholes can be formed and the entire section of the formation treated. This is called "diversion," as the treatment diverts later-injected acid away from the pathway followed by earlier-injected acid. In this case, the blockage must be temporary because all the wormholes are desired to serve as production pathways.

Corrosion Problems with Using Acids in Well Fluids

Although acidizing a portion of a subterranean formation can be very beneficial in terms of permeability, the use of acidizing fluids can have significant drawbacks. Even weakly acidic fluids can be problematic in that they can cause corrosion of metals. Corrosion can occur anywhere in a well production system or pipeline system, including anywhere downhole in a well or in surface lines and equipment.

The expense of repairing or replacing corrosion-damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. In addition, the partial neutralization of the acid from undesired corrosion reactions can result in the production of quantities of metal ions that are highly undesirable in the subterranean formation.

Leak-off Control or Matrix Diversion

In subterranean treatments in conventional reservoirs, it is often desired to treat a zone of a subterranean formation having sections of varying permeability, varying reservoir pressures, or varying degrees of formation damage, and thus may accept varying amounts of certain treatment fluids. Low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire zone. For instance, the treatment fluid may preferentially enter portions of the zone with low fluid flow resistance at the expense of portions of the zone with higher fluid flow resistance. Matrix diversion is different from zonal diversion between different zones.

Similar fluids and methods can be used for "leak-off control" in acid fracturing and for "diversion" in matrix acidizing Such a method or acidic fluid may be termed a "leak-off control acid system" or a "self-diverting acid system" depending upon its use and purpose.

Increasing the viscosity or gelling of a fluid can help divert subsequently introduced fluid from higher permeability to lower permeability portions of a zone. This can be useful for leak-off control in acid fracturing or matrix diversion in matrix acidizing A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

Breaking Fluid Viscosity or Gel

After a treatment fluid is placed where desired in the well and for the desired time, the viscous fluid or gel usually must be removed from the wellbore or the formation to allow for the production of oil or gas. To accomplish this removal, the viscosity of the treatment fluid must be reduced to a very low viscosity, preferably near the viscosity of water, for optimal removal from the zone of the subterranean formation.

Reducing the viscosity of a viscosified fluid is referred to as "breaking" the fluid. Chemicals used to reduce the viscosity of fracturing fluids are called "breakers."

No particular mechanism is necessarily implied by the term. A breaker or breaking mechanism should be selected based on its performance in the temperature, pH, time, and desired viscosity profile for each specific treatment.

Damage to Permeability

In well treatments using viscous well fluids, the material for increasing the viscosity of the fluid can damage the permeability of the proppant pack or the matrix of the subterranean formation. For example, a treatment fluid can include a polymeric material that is deposited in the fracture or within the matrix. By way of another example, the fluid may include surfactants that lead to sludge formation or change the wettability of the formation in the region of the fracture.

Viscoelastic Surfactants for Increasing Viscosity

Surfactants are compounds that lower the surface tension of a liquid, the interfacial tension between two liquids, or that between a liquid and a solid. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

A "surfactant package" can include one or more different chemical surfactants.

In a water phase, surfactants form aggregates, such as micelles, where the hydrophobic tails form the core of the aggregate and the hydrophilic heads are in contact with the surrounding liquid. The aggregates can be formed in various shapes such as spherical or cylindrical micelles or bilayers. The shape of the aggregates depends on the chemical structure of the surfactants, depending on the balance of the sizes of the hydrophobic tail and hydrophilic head.

As used herein, the term "micelle" includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

Certain types of surfactants can impart viscosity and elasticity to a fluid. Such a surfactant is referred to as a "viscoelastic surfactant" ("VES"). When used as a viscosity-increasing agent, the molecules (or ions) of the surfactant associate to form micelles of a certain micellar structure (e.g., rod-like, worm-like, vesicles, etc., which are referred to herein as "viscosifying micelles") that, under certain conditions (e.g., concentration, ionic strength of the fluid, etc.) are capable of, inter alia, imparting increased viscosity to a particular fluid or forming a gel. Certain viscosifying micelles may impart increased viscosity to a fluid such that the fluid exhibits viscoelastic behavior (e.g., shear thinning properties) due, at least in part, to the association of the surfactant molecules contained therein.

Viscoelastic Surfactants in Acidizing

The various types of cross-linked polymeric fluids that are commonly used in the treatment. However, such cross linked fluids are known to leave solid residue after the treatment and thereby damage the formation.

There are certain VES fluids that develop viscosity after the acid starts to spend. This results in better diversion that can be considered as another advantage of the VES fluid. The acid diversion is very important in acid stimulation treatment to enhance oil production by creating better wormholes. It also increases the depth of penetration of acid into the reservoir.

The viscoelastic surfactant fluids are gaining importance due to their less-damaging nature towards the formation as compared to crosslinked polymer fluids. The VES fluids develop viscosity by aggregation of surfactants molecules that shows similar properties of polymers. The VES fluid breaks down easily on dilution or contact with oil, thereby leaving negligible residue in the reservoir. The viscosity of a VES fluid depends on various factors such as the structure of the surfactant, nature of the counter ion, temperature, and presence of water-insoluble components.

The main limitation of VES fluids is the steep decrease in viscosity with increase in temperature that limits it application for high-temperature reservoirs. At present, known VES fluids can work only up to about 93° C. (200° F.) and cannot be used for higher temperatures. Hence there was a need to develop a VES fluid that will show good rheological properties at temperatures in the range of 93° C. (200° F.) to 150° C. (300° F.).

Since the VES fluid is pumped as a live acid, the incorporation of appropriate corrosion inhibitor is important to protect tubulars in a well. Unfortunately, corrosion inhibitors tend to interfere with the function of the VES. The formulated VES fluid should pass the corrosion test in live acid. The same fluid with spent acid should also show good rheology in the presence of the corrosion inhibitor at specified temperature. Hence there was also a need to develop a VES fluid that will show good rheological properties at temperatures above 93° C. (200° F.) with the inclusion of a corrosion inhibitor.

SUMMARY OF THE INVENTION

A treatment fluid and method treating a zone of a subterranean formation penetrated by a wellbore are provided. The treatment fluid includes: (i) water; (ii) a strong acid; and (iii) a branched viscoelastic surfactant having a hydrophobic portion with a total of 16 to 20 carbons; wherein the pH of the treatment fluid is less than 0.5 Preferably, the viscosity of the treatment fluid is less than 5 cP or mPa·s.

The method includes the steps of: (A) forming the treatment fluid; (B) introducing the treatment fluid through the wellbore into the zone; and (C) allowing time for the strong acid in the treatment fluid to spend in the formation. Preferably, as the acid spends in the zone and dissolves carbonate, the viscosity of the treatment fluid increases.

Such a treatment fluid shows good rheological properties at temperatures above 93° C. (200° F.).

Preferably, the treatment fluid includes a corrosion inhibitor. Even with a corrosion inhibitor, the branched VES fluid shows good rheological properties at higher temperatures above 93° C. (200° F.) up to at least 107° C. (225° F.).

Although the methods have been described here for, and are most typically used for, hydrocarbon production, they may also be used in storage wells and injection wells, and for production of other fluids, such as water or brine.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

DETAILED DESCRIPTION OF PRESENTLY PREFERRED EMBODIMENTS

Definitions and Usages

General Interpretation

Figure 1:
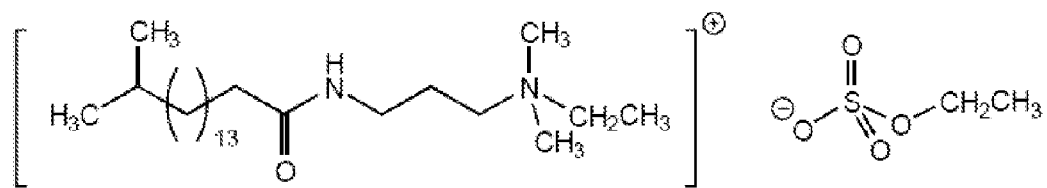
FIG. 1 is the chemical structure of isostearamidopropyl ethyldimonium ethosulfate.

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, oil and gas are understood to refer to crude oil and natural gas. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Carbonate, Sandstone, and Other Rocks

As used herein, a subterranean formation having greater than about 50% by weight of inorganic carbonate materials is referred to as a "carbonate formation." For matrix acidizing techniques in a carbonate formation, the carbonate formation preferably is greater than about 80% by weight of inorganic carbonate materials. For example, limestone is essentially calcium carbonate. Dolomite is essentially a combination of calcium carbonate and magnesium carbonate, wherein at least 50% of the cations are magnesium.

As used herein, a subterranean formation having greater than about 50% by weight of inorganic siliceous materials (e.g., sandstone) is referred to as a "sandstone formation."

A shale formation is a subterranean formation of shale. It is the most abundant sedimentary rock.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introduced at least into and through the wellhead. According to various techniques known in the art, tubulars, equipment, tools, or well fluids can be directed from the wellhead into any desired portion of the wellbore.

As used herein, the word "tubular" means any kind of body in the form of a tube. Examples of tubulars include, but are not limited to, a drill pipe, a casing, a tubing string, a line pipe, and a transportation pipe. Tubulars can also be used to transport fluids into or out of a subterranean formation, such as oil, gas, water, liquefied methane, coolants, and heated fluids. For example, a tubular can be placed underground to transport produced hydrocarbons or water from a subterranean formation to another location. Tubulars can be of any suitable body material, but in the oilfield are most commonly of steel.

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation.

A well service usually involves introducing a well fluid into a well. As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (32 m$^3$), it is sometimes referred to as a wash, dump, slug, or pill.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a well fluid used in a treatment. Unless the context otherwise requires, the word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

The term "damage" as used herein regarding a formation refers to undesirable deposits in a subterranean formation that may reduce its permeability. Scale, skin, gel residue, and hydrates are contemplated by this term. Also contemplated by this term are geological deposits, such as, but not limited to, carbonates located on the pore throats of a sandstone formation.

As used herein, a "downhole" fluid (or gel) is an in-situ fluid in a well, which may be the same as a well fluid at the time it is introduced, or a well fluid mixed with another fluid downhole, or a well fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular well fluid or stage of a well service. A well service may include design parameters such as fluid volume to be pumped, required pumping time for a treatment, or the shear conditions of the pumping.

The term "design temperature" refers to an estimate or measurement of the actual temperature at the down hole environment at the time of a well. That is, design temperature takes into account not only the bottom hole static temperature ("BHST"), but also the effect of the temperature of the well fluid on the BHST during treatment. The design temperature is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

The use of the term "acidizing" herein refers to the general process of introducing an acid down hole to acidize a portion of a subterranean formation or any damage contained therein. It can refer to either matrix or fracturing types of acidizing treatments.

Physical States and Phases

As used herein, "phase" is used to refer to a substance having a chemical composition and physical state that is distinguishable from an adjacent phase of a substance having a different chemical composition or different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. The continuous phase of a well fluid is a liquid under Standard Laboratory Conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a "water-based" fluid means that water or an aqueous solution is the dominant material, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid.

In the context of a well fluid, oil is understood to refer to an oil liquid, whereas gas is understood to refer to a physical state of a substance, in contrast to a liquid. In this context, an oil is any substance that is liquid under Standard Laboratory Conditions, is hydrophobic, and soluble in organic solvents. Oils have a high carbon and hydrogen content and are non-polar substances. This general definition includes classes such as petrochemical oils, vegetable oils, and many organic solvents. All oils can be traced back to organic sources.

Apparent Viscosity

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise ("cP"), which are equivalent.

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a cross linked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ 5550 HPHT viscometer. Such a viscometer measures viscosity as a function of time, temperature, and shear rate. The viscosity-measuring instrument can be calibrated using standard viscosity silicon oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

A substance is considered to be a fluid if it has an apparent viscosity less than 5,000 mPa·s (cP) (independent of any gel characteristic). For reference, the viscosity of pure water is about 1 mPa·s (cP) at 20° C. (or 68° F.).

As used herein, for the purposes of matrix diversion in an acidizing treatment, the viscosity of a spent acidizing fluid should be higher than the reservoir oil present in the formation rock. The rheology of the oil can vary from location of location and from reservoir to reservoir. In addition, the viscosity of oil decreases with increasing temperature, that is, in a formation with a higher bottom hole temperature (BHT). As a rule of thumb, the average viscosity of oil is considered to be 50 mPa·s (50 cP) at 40 l/s. In general, viscosity of spent acid fluid above 50 mPa·s (50 cP) is considered as the accepted value at designated temperature. The higher viscosity is always desirable.

Solubility

A substance is considered to be "soluble" in a liquid if at least 10 grams of the substance can be dissolved in one liter of the liquid (which is at least 83 ppt) when tested at 77° F. and 1 atmosphere pressure for 2 hours, considered to be "insoluble" if less than 1 gram per liter (which is less than 8.3 ppt), and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Corrosion and Inhibitors

Corrosion of metals can occur anywhere in an oil or gas production system, such in the downhole tubulars, equipment, and tools of a well, in surface lines and equipment, or transportation pipelines and equipment.

"Corrosion" is the loss of metal due to chemical or electrochemical reactions, which could eventually destroy a structure. The corrosion rate will vary with time depending on the particular conditions to which a metal is exposed, such as the amount of water, pH, other chemicals, temperature, and pressure. Examples of common types of corrosion include, but are not limited to, the rusting of metal, the dissolution of a metal in an acidic solution, oxidation of a metal, chemical attack of a metal, electrochemical attack of a metal, and patina development on the surface of a metal.

Even weakly acidic fluids having a pH about 4 can be problematic in that they can cause corrosion of metals. As used herein with reference to the problem of corrosion, "acid" or "acidity" refers to a Bronsted-Lowry acid or acidity.

As used herein, the term "inhibit" or "inhibitor" refers to slowing down or lessening the tendency of a phenomenon (e.g., corrosion) to occur or the degree to which that phenomenon occurs. The term "inhibit" or "inhibitor" does not imply any particular mechanism, or degree of inhibition.

When included, a corrosion inhibitor is preferably in a concentration of at least 0.1% by weight of a fluid. More preferably, the corrosion inhibitor is in a concentration in the range of 0.1% to 15% by weight of the fluid.

A corrosion inhibitor "intensifier" is a chemical compound that itself does not inhibit corrosion, but enhances the effectiveness of a corrosion inhibitor over the effectiveness of the corrosion inhibitor without the corrosion inhibitor intensifier. According to a preferred embodiment of the invention, the corrosion inhibitor intensifier is selected from the group consisting of: formic acid, potassium iodide, and any combination thereof.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the aqueous phase of the fluid without the weight of any viscosity-increasing agent, dissolved acid or salt, suspended particulate, or other materials or additives that may be present in the water.

If there is any difference between U.S. and Imperial units, U.S. units are intended. For example, "GPT" or "gal/Mgal" means U.S. gallons per thousand U.S. gallons and "ppt" means pounds per thousand U.S. gallons.

The conversion between lb/Mgal and kg/m$^3$ is: 1 lb/Mgal= (0.453592 kg/lb)×(Mgal/3.78541 m$^3$)=0.12 kg/m$^3$.

DETAILED DESCRIPTION OF THE INVENTION

VES fluids form asymmetric rod-shaped aggregations, known as micelles, that entangle on the application of shear and hence develops high viscosity. On the dilution or in contact with oil, these rod-shaped micelles are transformed into more symmetrical spherical micelles, which results in low viscosity, referred to as "breaking" of the viscosified fluid. The same effect is observed with increase in the temperature. The shape of the aggregation (whether rod-shaped or spherical) depends upon various factors such as the chemical structure of the VES, the concentration of the surfactant, nature of counter ions, ionic salt concentration, pH, solubilized components (if any), co-surfactants, and temperature.

The thinning of VES fluids at higher temperature can be avoided by modifying the chemical structure of the surfactants. According to the invention, a new type of surfactant is used in a fluid for acid stimulation, wherein the surfactant has branching in the hydrophobic portion of the molecule, which allows the VES fluid to retain its viscosity at higher temperature. The branched VES has a hydrophobic portion with a total of 16 to 20 carbons, preferably a total of 18 carbons, including the branch. The branch preferably has 1 to 3 of the carbons of the hydrophobic portion. The nitrogen portion of the branched VES can have short chain alkyl groups, such as methyl, ethyl, propyl groups attached to nitrogen atom.

The surfactant is selected based on the structure-property relationship. The main structural aspect of the surfactant is branching in the hydrophobic part of the molecule and the presence of an organic counter ion that results in improved interactions between molecules to form a viscous fluid even at higher temperatures. An example of a branched VES fluid showed it can retain viscosity up to at least 150° C. (300° F.) in simulated 20% spent acid.

It is important to inhibit the corrosion on the steel surfaces in an oil well when they are contacted with acidizing fluids. The higher rate of corrosion caused by using strongly acidic fluids at higher temperature is another challenge, however, because the incorporation of corrosion inhibitors tends to reduce the viscosity of a VES fluid.

A non-branched VES cannot be used at temperature higher than 93° C. (200° F.). An example of a branched VES showed better rheology than non-branched VES. The viscosity of VES fluids containing non-branched VES or branched VES is reduced in presence of a formulated corrosion inhibitor, however.

Preferably, a corrosion inhibitor is incorporated into the fluid. The branched VES allows for retaining viscosity with the corrosion inhibitor up to at least 107° C. (225° F.). The formulation also exhibited low corrosion loss of P-110 alloy in live acid at 107° C. (225° F.). Accordingly, a branched VES with the use of a corrosion inhibitor can be used as a diverting agent in stimulation of reservoirs with a design temperature of up to 107° C. (225° F.).

Treatment Fluids

According to an embodiment, a treatment fluid for use according to the invention includes: (i) water; (ii) a strong acid; and (iii) a branched viscoelastic surfactant having a hydrophobic portion with a total of 16 to 20 carbons; wherein the pH of the treatment fluid is less than 0.5. Preferably, the treatment fluid additionally includes a corrosion inhibitor.

After the acid spends such that the concentration of dissolved inorganic salts (i.e., the salinity) of the fluid increases, the treatment fluids according to the invention become viscous, non-Newtonian, shear-thinning fluids.

In an embodiment, a treatment fluid according to the invention is formulated such that viscosity will not build above 5 mPa·s (5 cP) until at least some of the acid spends against materials in or of a subterranean formation in a well.

Water in Continuous Aqueous Phase

The continuous aqueous phase of the treatment fluid is a liquid. According to the invention, the treatment fluid is preferably a water-based fluid.

Preferably, the water for use in the treatment fluid does not contain anything that would adversely interact with the other components used in accordance with this invention or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water.

In some embodiments, the aqueous phase of the treatment fluid may comprise a brine. The brine chosen should be compatible with the formation and should have a sufficient density to provide the appropriate degree of well control.

Salts may optionally be included in the treatment fluids of the present invention for many purposes. For example, salts may be added to a water source, for example, to provide a brine, and a resulting treatment fluid, having a desired density. Salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid suitable for use in the present invention.

Suitable salts can include, but are not limited to, sodium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Bronsted-Lowry Acid

As used herein, "acid" or "acidity" refers to a Bronsted-Lowry acid or acidity.

The pH value represents the acidity of a solution. The potential of hydrogen (pH) is defined as the negative logarithm of the hydrogen concentration, represented as $[H^+]$ in moles/liter.

Mineral acids tend to dissociate in water more easily than organic acids, to produce $H^+$ ions and decrease the pH of the solution. Organic acids tend to dissociate more slowly than mineral acids and less completely.

Relative acid strengths for Bronsted-Lowry acids are expressed by the dissociation constant (pKa). A given acid will give up its proton to the base of an acid with a higher pKa value. The bases of a given acid will deprotonate an acid with a lower pKa value. In case there is more than one acid functionality for a chemical, "pKa(1)" makes it clear that the dissociation constant relates to the first dissociation.

Water ($H_2O$) is the base of the hydronium ion, $H_3O^+$, which has a pka $-1.74$. An acid having a pKa less than that of hydronium ion, pKa $-1.74$, is considered a strong acid.

For example, hydrochloric acid (HCl) has a pKa $-7$, which is greater than the pKa of the hydronium ion, pKa $-1.74$. This means that HCl will give up its protons to water essentially completely to form the $H_3O^+$ cation. For this reason, HCl is classified as a strong acid in water. One can assume that all of the HCl in a water solution is 100% dissociated, meaning that both the hydronium ion concentration and the chloride ion concentration correspond directly to the amount of added HCl.

Acetic acid ($CH_3CO_2H$) has a pKa of 4.75, greater than that of the hydronium ion, but less than that of water itself, 15.74. This means that acetic acid can dissociate in water, but only to a small extent. Thus, acetic acid is classified as a weak acid.

Strong Acid

In embodiments of the present invention, suitable strong acids can be any acid generally used in fracture acidizing or matrix acidizing, including by way of example, but again not limited thereto, HCl, HBr, and mixtures thereof. Hydrochloric acid is the presently most preferred embodiment, as it is the most widely used strong acid for acidizing of carbonate formations.

There is a strong demand for acidizing with strong acids, especially very strongly acidic 20% to 28% HCl acid.

The concentration of the strong acid is sufficient that the pH of the continuous phase of the treatment fluid is less than 0.5, which would be the pH, for example, of a solution of 1.4% HCl, Preferably, the concentration of the strong acid is sufficient such that the pH of the continuous aqueous phase of the treatment fluid is in less than zero. More preferably, the pH is less than minus 0.5.

The present disclosure relates to the development of an acid system, for example using about 20% to about 28% HCl acid strength. The system is expected to have particular application in carbonate formations at high BHST up to at least 300° F. The system will give better wormholing at high temperature and can be used with acid strength ranging 20% to 28% to provide enhanced oil production from the formation.

Optional Weak Acid or Buffer as pH Adjuster

Other weak acids can be included in the treatment fluid. For example, weak mineral acids such as hydrofluoric acid or weak organic acids such as acetic acid and formic acid can be included. However, concentrations of organic acid anions may interfere with the function of the non-Branched VES. Preferably, a concentration of an organic acid anions or any combination of organic acid ions is sufficiently low so as not to interfere with the VES building viscosity as the strong acid spends.

In certain embodiments, the pH-adjuster comprises a salt of an organic acid such as sodium or potassium formate, sodium or potassium acetate, sodium or potassium citrate, sodium or potassium glycolate, sodium or potassium maleate, sodium or potassium phosphate, potassium dihydrogen phosphate, cesium formate, and any combinations thereof. In other embodiments, the pH-adjuster may be any other substance known in the art capable of maintaining the pH of the breaker above or below a desired limited range. One of ordinary skill in the art, with the benefit of this disclosure, will recognize the appropriate pH-adjuster and amount thereof to use for a chosen application.

It should be understood, however, that in an embodiment the treatment fluid need not and does not include hydrofluoric acid, which is not normally required for acidizing of carbonate formations. Preferably, the treatment fluid contains less than 5% by weight HF. More preferably, it does not contain any HF.

Viscosiffing Surfactants (i.e. Viscoelastic Surfactants)

It should be understood that merely increasing the viscosity of a fluid may only slow the settling or separation of distinct phases and does not necessarily stabilize the suspension of any particles in the fluid.

Certain viscosity-increasing agents also increase the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the three-dimensional association of surfactant molecules to form viscosifying micelles. When the concentration of the viscoelastic surfactant in a viscoelastic fluid significantly exceeds a critical concentration, and in most cases in the presence of an electrolyte, surfactant molecules aggregate into species such as micelles, which can interact to form a network exhibiting elastic behavior.

As used herein, the term "VES fluid" (or "surfactant gel") refers to a fluid that exhibits or is capable of exhibiting viscoelastic behavior due, at least in part, to the association of a VES contained therein that forms viscosifying micelles, for example, under conditions of appropriate concentration of the VES and the salinity of the fluid.

Viscoelastic surfactants may be cationic, anionic, or amphoteric in nature. The viscoelastic surfactants can include any number of different compounds, including ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

There are certain VES fluids that develop viscosity after the acid starts to spend. Without being limited by any theory, this viscosification is believed to be due to the increase in salinity of the system as acid spends on limestone or dolomite formations releasing either $CaCl_2$ or a mixture of $CaCl_2$ and $MgCl_2$ in the system. With an increase in the salinity, the surfactant molecules rearrange themselves into asymmetric rod-shaped micelles that become entangled with the application of shear and hence the fluid develops high viscosity. The increase in viscosity as the acid spends results in better diversion, which can be considered as another advantage of using a VES fluid. The acid diversion is very important in an acid stimulation treatment to enhance oil production by creating better wormholes. It also increases the depth of penetration of acid into the reservoir.

An example of a VES that develops viscosity as an acid spends is a mixture of 75% (w/w) active surfactant a quaternary ammonium fatty amine, specifically bis(hydroxyethyl) methyloleylammonium chloride (CAS 18448-65-2), in a suitable solvent, preferably 25% propylene glycol (CAS 57-55-6). It is used as a viscoelastic surfactant for acidizing applications (e.g., using HCl). While little viscosity is imparted to the live acid by this VES at low pH, once the acid spends, the viscosity rapidly climbs. Accordingly, acids such as HCl with VES form an effective self-diverting acid system. When used in self-diverting acid systems, VES is commonly used at a concentration of about 4% v/v (40 g/Mgal) to about 6% v/v (60 gal/Mgal).

The propylene glycol with the surfactant is a solvent present in the commercial mixture. It is used as a solvent in the reactions to synthesize the surfactant compounds. It is also useful to maintain this formulation flowable for handling purpose. It can neither act as a surfactant nor as a co-surfactant. It is uncharged species and hence cannot interfere in the formation of aggregation of surfactant molecules, which is basis of building viscosity in a fluid. Propylene glycol is not essential but it may affect the solvent properties of water that can affect aggregation of these surfactant molecules.

According to the present invention, the branched VES has a hydrophobic portion with a total of 16 to 20 carbons. Preferably, the branched viscoelastic surfactant is or comprises a viscoelastic surfactant having a hydrophilic portion including a nitrogen atom with short chain alkyl groups on the nitrogen. More preferably, the branched viscoelastic surfactant is or comprises a quaternary of a branched fatty acid substituted amidoamine. In an presently preferred embodiment, the branched viscoelastic surfactant is or comprises N-Ethyl-N,N-Dimethyl-[(3-Oxoisooctadecyl)Amino]-1-Propanaminium Ethyl Sulfate.

Preferably, the branched VES is in a concentration in the range of about 1% by weight to about 15% by weight of the water. More preferably, the branched VES is in a concentration in the range of about 5% by weight to about 10% by weight of the water.

Without being limited by any theory, as the VES fluid is believed to build viscosity based on an increase in salinity, the initial salinity of the aqueous phase of the fluid should be at least sufficiently low so as to not provide initial viscosity to the VES fluid. Preferably, the salinity should be less than about 7% wt/vol of the aqueous phase. More preferably, the salinity is less than about 5% wt/vol.

Optional Co-Surfactant with Viscoelastic Surfactant

The VES fluid optionally may comprise one or more co-surfactants, among other purposes, to facilitate the formation of micelles (e.g., viscosifying micelles), increase salt tolerability, or stabilize the viscoelastic surfactant fluid. For example, co-surfactants can comprise any surfactant suitable for use in subterranean environments that itself cannot work as VES but it can enhance the desired rheology of a VES fluid by increasing the viscosity developed after the acid is spent, which is believed to be due to the increased salinity caused by the acid reacting with materials such as carbonates.

In certain embodiments, the co-surfactant may be present in an amount in the range of from about 0.1% to about 2% by volume of the viscoelastic surfactant fluid. In certain embodiments, the co-surfactants may be present in an amount in the range of from about 0.25% to about 0.5% by volume of the viscoelastic surfactant fluid.

The type and amount of a co-surfactant suitable in a particular application may depend upon a variety of factors, such as the type of surfactant present in the viscoelastic surfactant fluid, the composition of the well fluid, the temperature of the fluid, and the like. A person of ordinary skill, with the benefit of this disclosure, will recognize when to include a co-surfactant in a particular application, as well as the appropriate type and amount of co-surfactant to include.

Compatible Additives

In embodiments of the present invention, other components or additives can be included in the treatment fluid provided that they are compatible with all required components and functions of the treatment fluid and do not unduly interfere with its performance. Typical additives that may be included are pH control additives, corrosion inhibitors, silicate control additives, emulsion and sludge preventers, and non-emulsifying agents known to those in the field.

Any additives should be tested for compatibility with the treatment fluid being used.

For example, corrosion inhibitors are preferably included in acidizing fluids to protect oilfield equipment and tubulars, but not all corrosion inhibitors are compatible with the treatment fluid and methods according to the invention. Commercially-available corrosion inhibitors are typically mixtures of two or more chemical compounds, some of which may irreversibly crosslink the polymer or may be strong reducing or oxidizing agents. Commercial corrosion inhibitor packages should therefore always be tested before use for compatibility with the treatment fluid being used.

Preferably, Avoid Particulate in the Acidizing Fluid

Preferably, the treatment fluids used in self-diverting acidizing applications contain no solids or particulates, especially of particles larger than silt. This can be particularly important when using coiled tubing, as larger particulates could bridge when pumping through the coiled tubing.

Preferably, there are no damaging solid particles in the treatment fluids used in the methods, so the reduced-viscosity of the spent fluid is readily flowed back from the well along with the remains of the spent acid from the treatment.

Method of Treating a Well with the Well Fluid

According to another embodiment of the invention, a method of treating a well, is provided, the method including the steps of: forming a treatment fluid according to the invention; and introducing the treatment fluid into the well.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

In an embodiment, the step of introducing is at a rate and pressure below the fracture pressure of the treatment zone.

In an embodiment, the step of introducing comprises introducing under conditions for fracturing a treatment zone. The fluid is introduced into the treatment zone at a rate and pressure that are at least sufficient to fracture the zone.

The method preferably further includes the step of: allowing time for the strong acid and any other acids in the previously-introduced treatment fluid to spend against the formation. The method preferably further includes the step of: flowing back the liquid from the zone.

Most preferably, the treatment fluid is allowed to spend that pH increased above 2.0. Preferably to spends the acid so that the pH is in the range of 3-6. After allowing time to reach the desired pH, the method preferably includes the step of flowing back from the treated zone.

After the fluid is spent in a well, flow back fluid comes with produced oil. The flow back fluid has a substantially neutral pH. Accordingly, there are few concerns for disposal of the flow back fluid after an acidizing treatment according to the invention. If for any reason the acid is not fully spent before flowback, the excess acid should be neutralized before disposal of the flowback fluid.

In an embodiment, the step of flowing back is within 24 hours of the step of introducing. In another embodiment, the step of flowing back is within 16 hours of the step of introducing.

Preferably, after any such well treatment, a step of producing hydrocarbon from the zone of the subterranean formation is desirable.

EXPERIMENTS AND EXAMPLES

Laboratory Chemicals

An example of a branched VES having a hydrophobic portion with a total of 16 to 20 carbons is available as a commercial product from Lubrizol Advanced Materials, Inc. of Ohio as SCHERCOQUAT™ IAS-PG. The SCHERCOQUAT™ IAS-PG is a highly concentrated liquid quaternary of an isostearic substituted amidoamine, specifically, isostearamidopropyl ethyldimonium ethosulfate (chemical name N-Ethyl-N,N-Dimethyl-[(3-Oxoisooctadecyl)Amino]-1-Propanaminium Ethyl Sulfate) (CAS 6763 3-63-0) (80-90% w/w), and propylene glycol (8-20%, w/w). Another compound isostearamidopropyl dimethyl amine (CAS 67799-04-6) is also present in small amount (0.5% to 1.5% w/w). The chemical structure of isostearamidopropyl ethyldimonium ethosulfate is shown in FIG. 1.

In contrast, an example of a non-branched VES used in the testing is a mixture of 75% (w/w) active surfactant a quaternary ammonium fatty amine, specifically bis(hydroxyethyl) methyloleylammonium chloride (CAS 18448-65-2), in a suitable solvent, preferably 25% propylene glycol (CAS 57-55-6). It is used as a viscoelastic surfactant for acidizing applications (e.g., using HCl). While little viscosity is imparted to the live acid by this non-branched VES, once the acid spends, the viscosity rapidly climbs. Accordingly, acids such as HCl with non-branched VES form an effective self-diverting acid system. When used in self-diverting acid systems, non-branched VES is commonly used at a concentration of about 4% v/v (40 g/Mgal) to about 6% v/v (60 gal/Mgal).

Both partial as well as complete replacement of non-branched VES with a branched VES is possible.

The propylene glycol with the surfactant is a solvent present in the commercial mixture. It is used as a solvent in the reactions to synthesize the surfactant compounds. It is also useful to maintain this formulation flowable for handling purpose. It can neither act as a surfactant nor as a co-surfactant. It is uncharged species and hence cannot interfere in the formation of aggregation of surfactant molecules which is basis of gel formation. Propylene glycol is not essential but it may affect the solvent properties of water that can affect aggregation of these surfactant molecules.

Whenever the percent of the non-branched VES or IAS-PG is mentioned, it means the volume of the commercial mixture including the solvent in the test fluid. For example, the % v/v is based on the concentration of the non-branched VES and the SCHERCOQUAT™ IAS-PG, which both include propylene glycol, and not based on the volume or weight of the surfactant alone. The concentration of the surfactant can be calculated based on the known composition of the surfactant with propylene glycol.

Propylene glycol is a solvent present in the commercial mixture. It is used as a solvent in the chemical reactions to synthesize the surfactant (bis(hydroxyethyl)methyloleylammonium chloride). It is also useful to maintain this formulation flowable for handling purpose. It can neither act as a surfactant nor as a co-surfactant. It is uncharged species. Propylene glycol is not essential for the purposes of the present invention. Depending on the concentration, however, it could affect the solvent properties of water, which could affect aggregation of the surfactant molecules.

The tested example of a corrosion inhibitor is a formulated corrosion inhibitor containing aldehyde, methanol, isopropanol, quaternary ammonium salt (preferably 1-(benzyl) quinolinium chloride), and ethoxylated non-ionic surfactants.

The tested example of corrosion inhibitor intensifier is formic acid (which converts to a formate salt on neutralization).

Procedure for Preparation of Spent Acid and Rheology Testing

The composition of spent acid can vary depending upon type of formation rock involved in the treatment. The 20% HCl (w/w) when spent with Dolomite ($CaCO_3+MgCO_3\sim1:1$ mole ratio) will give solution of 16.3% $MgCl_2$ and 19.0% $CaCl_2$ (Average is 17.63%~18% for each). In actual case of dolomite, the molar ratio can deviate more towards $MgCO_3$ whereas natural formation can also exist as mixture of dolomite with limestone (CaCO3). Hence, rheology (i.e., viscosity) testing was simulated with 20% spent acid (18% MgCl2 and 18% CaCl2).

The simulated spent acid can be prepared by adding all the components of viscoelastic fluid system in water containing $MgCl_2$ (18%) and $CaCl_2$ (18%). The pH of the fluid was adjusted to 4±0.5. The fluid was stirred in blender jar at high speed to ensure the uniform mixing of spent acid fluid. After mixing, the entrapped air was removed by centrifugation at 5500 rpm for 10 minutes.

The stimulated spent acid recipe was centrifuged to avoid any air entrapment then loaded into the viscometer. The tests were conducted up to 150° C. (300° F.) and 300 psi pressure. The rheology profile of the fluid was measured at 40 sec$^{-1}$, 100 sec$^{-1}$, and 170 sec$^{-1}$.

The viscosity was measured using HTHP 5550 viscometer (AMETECK Chandler engineering) under 400 psi nitrogen pressure. It measures the viscosity of fluid at various temperatures and shear rates. The B5X Bob was used with 420 spring in all the tests. The temperature was attained by heating jacket and sufficient time was allowed to attain equilibrium of set temperature (at least 10 minutes). The readings were taken in the increasing order of temperature at the different shear rates.

Procedure for the Preparation of the Live Acid and Static Weight-Loss Corrosion Testing The live acid blend was prepared by adding all the components including VES in Pune Tap Water ("PTW"). Concentrated HCl (35% w/w) was added in to the solution to make up the required live acid.

For corrosion weight-loss testing, a coupon of casing grade metal alloy material (Low alloy carbon steel) was used, specifically "P110" having the following specifications: chemical composition in %: C, 0.26~0.35, Si: 0.17~0.37, Mn: 0.4~0.7, P:≤0.02, S≤0.01, Cr: 0.8~1.1, Ni:≤0.2, Cu≤0.2, Mo≤0.15~0.25, V≤0.08, Al≤0.02, and remaining Fe with mechanical properties as: Tensile strength:≥862 MPa; Yield Strength: 758~965 MPa.

Static weight-loss corrosion tests were performed as follows. High pressure, high temperature ("HPHT") static weight loss corrosion testing was performed in individual HASTELLOY™ model B-2 autoclaves. Weighing of the metal specimens (sometimes referred to in the art as "coupons") was on a balance accurate to 0.001 gram (g).

The metal alloy specimens were cleaned by degreasing with acetone followed by removal of the surface scale by lightly bead blasting the surface. Each specimen of approximate surface area 4.4 in$^2$ was accurately measured in square inches and accurately weighed in grams.

Test Fluids were Prepared by Mixing the Desired Components.

Each test fluid was placed into a glass cell, followed by introduction of a metal specimen. After capping the cell, the container with the test fluid and the alloy specimen were placed in the autoclave. The autoclave was filled with a heat transfer medium and pressurized to a test pressure of 1,000 psi with nitrogen gas. Heating was accomplished using EUROTHERM™ controllers that adjust a specific heating ramp up to the test temperature via a computer control. Pressure was maintained using a back pressure regulator assembly which allows for automatic bleed-off of excess pressure developed during heating and corrosion. Test times were contact times and included heat up and cool down times. The test times were the total contact time of the test fluid on the specimen.

At the end of the test time, the alloy test specimen was removed from the test fluid, then cleaned with acetone and a light brushing to remove surface deposits, and finally dried and weighed.

The corrosion loss in units of lb/ft$^2$ was calculated using the following equation:

$$[(Wt.B\ g-Wt.A\ g)/(S.A.\ in^2)]*[(144\ in^2/ft^2)/(453.6\ g/lb)]=corrosion\ loss\ (lb/ft^2)$$

where "S.A. in$^2$" is the surface area of a coupon measured in square inches, "Wt.B" was the weight in grams of the coupon before testing, and where "Wt.A" is the weight in grams of the coupon after testing.

According to this method, the standard for an acceptable corrosion loss for carbon steel is less than or equal to 0.05 lb/ft$^2$ under the design conditions of acid and concentration and of fluid contact time at a specified temperature and pressure.

Experimental details, including test fluid compositions, type of metal alloy specimen, and the testing time and temperature, are discussed below.

Rheology of Spent Acid with Non-Branched VES at High Temperatures

Figure 2:
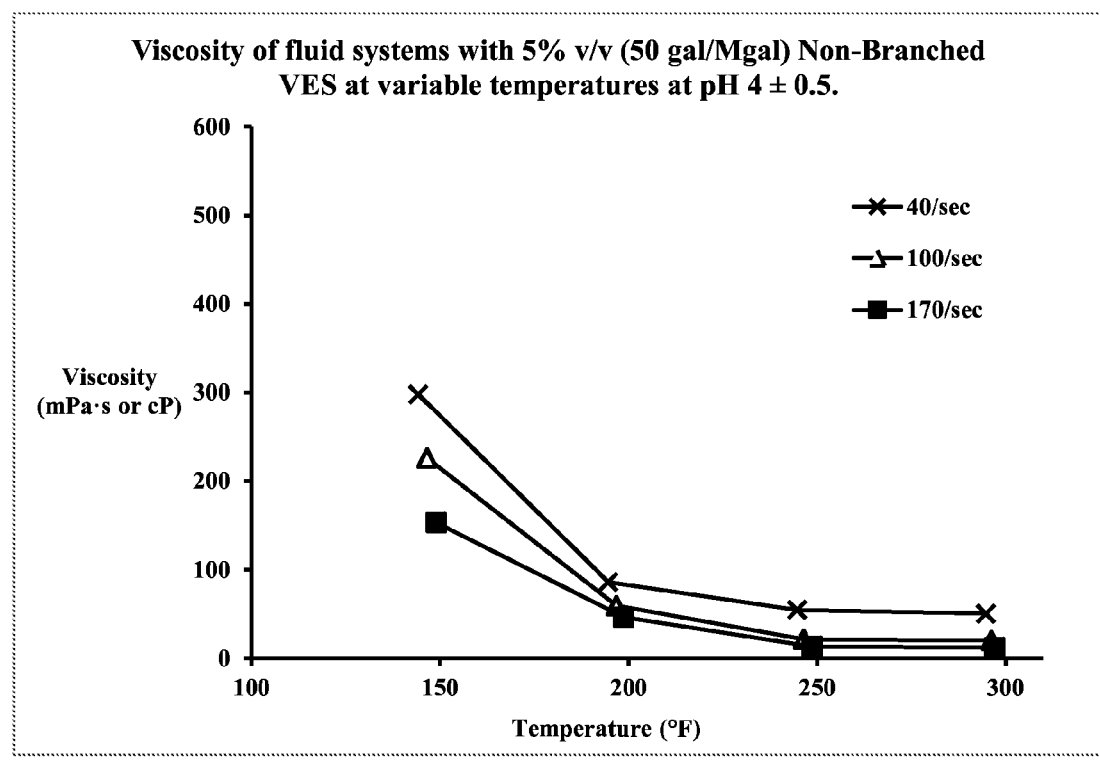
FIG. 2 is a graph showing the viscosity of spent acid with 5% v/v (50 gal/Mgal) non-branched VES at various temperatures and shear rates.
Figure 3:
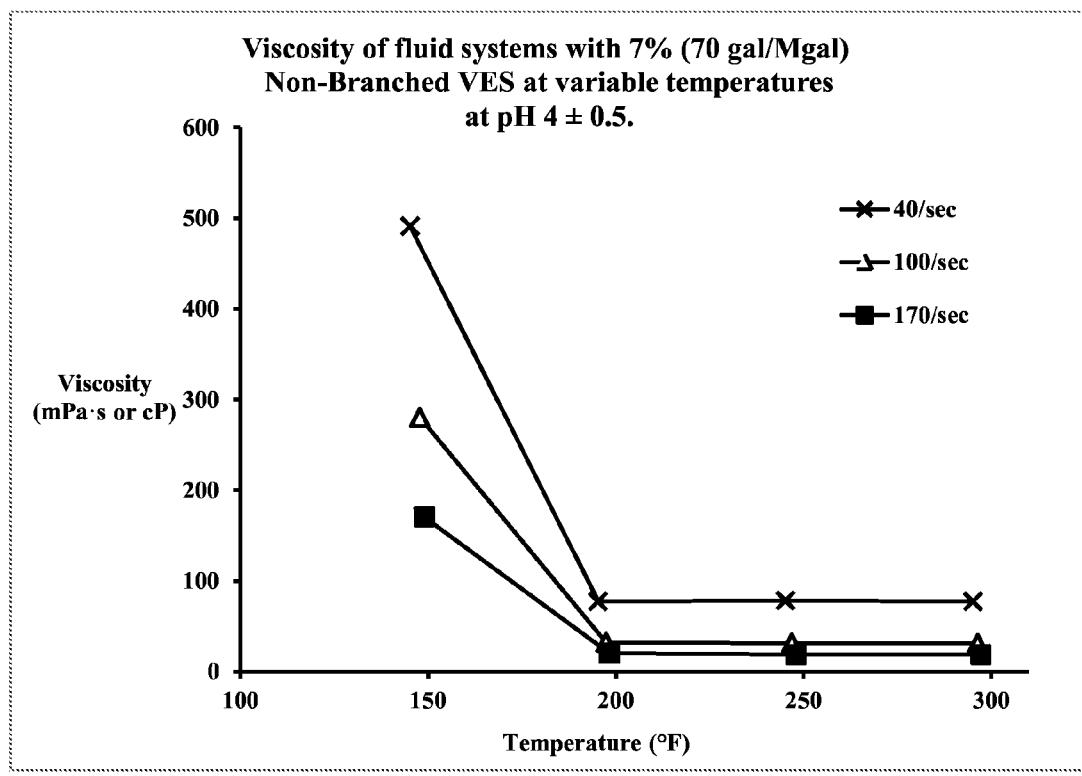
FIG. 3 is a graph showing the viscosity of spent acid with 7% v/v (70 gal/Mgal) non-branched VES at various temperatures and shear rates.
Figure 4:
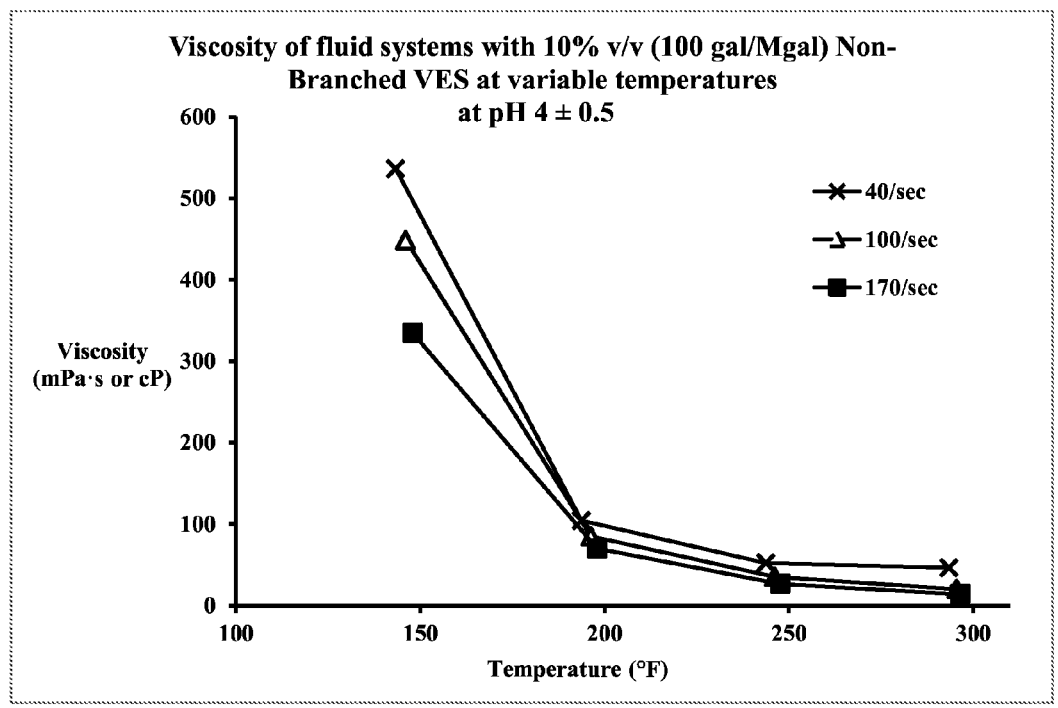
FIG. 4 is a graph showing the viscosity of spent acid with 10% v/v (100 gal/Mgal) non-branched VES at various temperatures and shear rates.

Non-branched VES is used in many HCl acid-based systems as a diverting system. These non-branched VES are known to develop viscosity only when the acid starts to spend. Because the main objective of this project was to extend the temperature limit of non-branched VES, the rheology of VES fluid containing 5% v/v (50 gal/Mgal), 7% v/v (70 gal/Mgal), and 10% v/v (100 gal/Mgal) of non-branched VES in simulated spent acid was studied as control (see Table 1, FIG. 2, FIG. 3, and FIG. 4).

Figure 5:
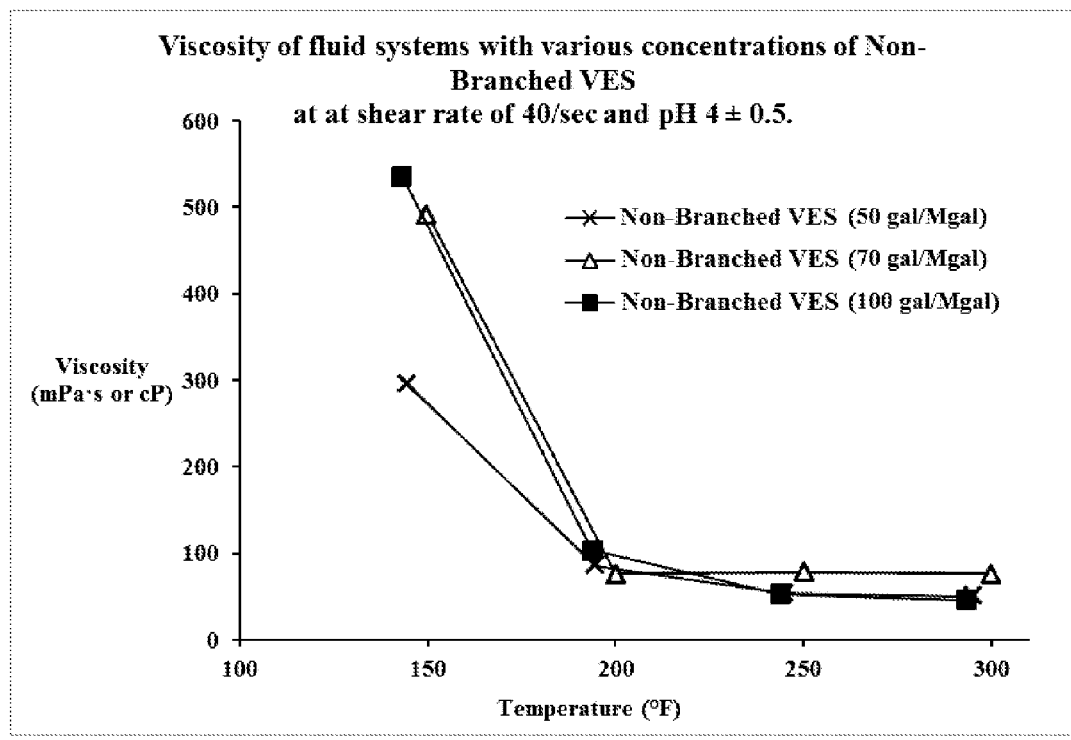
FIG. 5 is a graph showing the effect of concentration of non-branched VES as VES on the viscosity of spent acid at shear rate of 40/sec.
Figure 6:
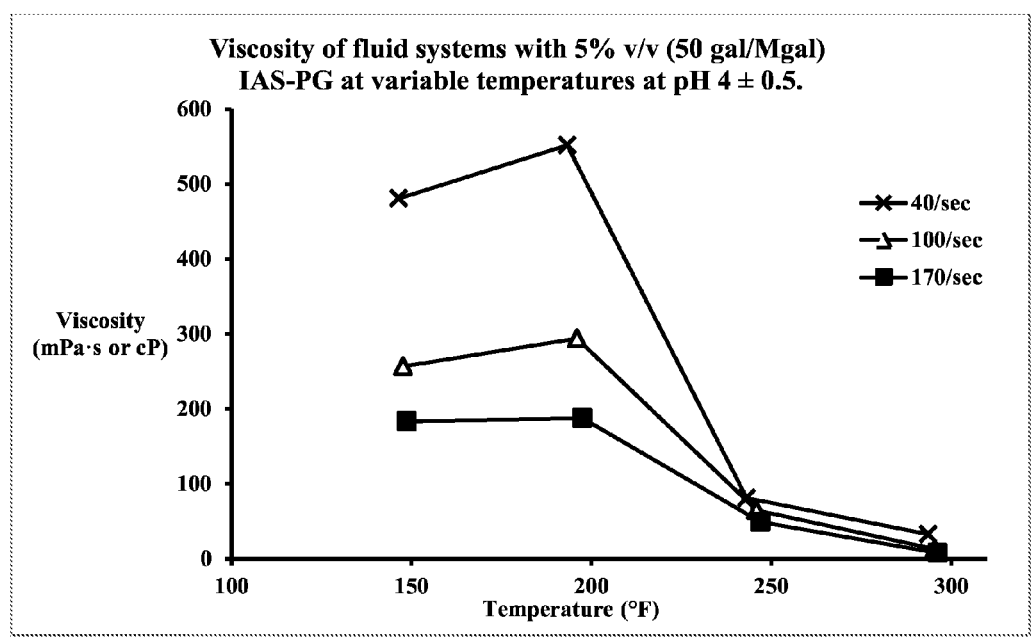
FIG. 6 is a graph showing the viscosity of spent acid with 5% v/v (50 gal/Mgal) IAS-PG at various temperatures and shear rates.
Figure 7:
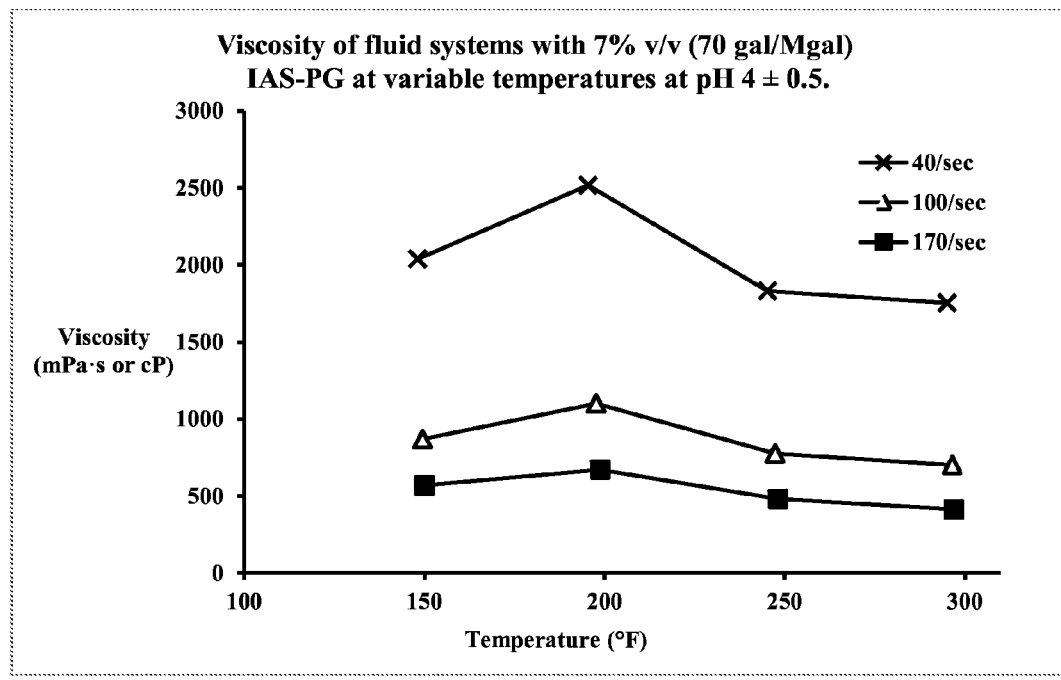
FIG. 7 is a graph showing the viscosity of spent acid with 7% v/v (70 gal/Mgal) IAS-PG VES at various temperatures and shear rates.
Figure 8:
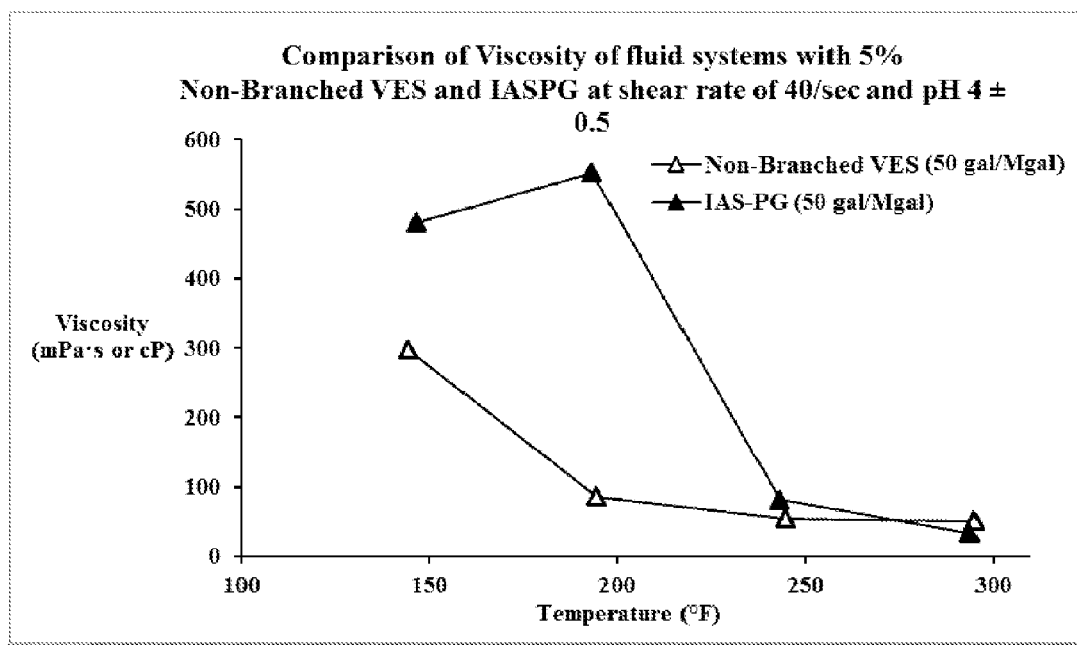
FIG. 8 is a graphical comparison of viscosity of spent acid with 5% v/v (50 gal/Mgal) IAS-PG and non-branched VES.
Figure 9:
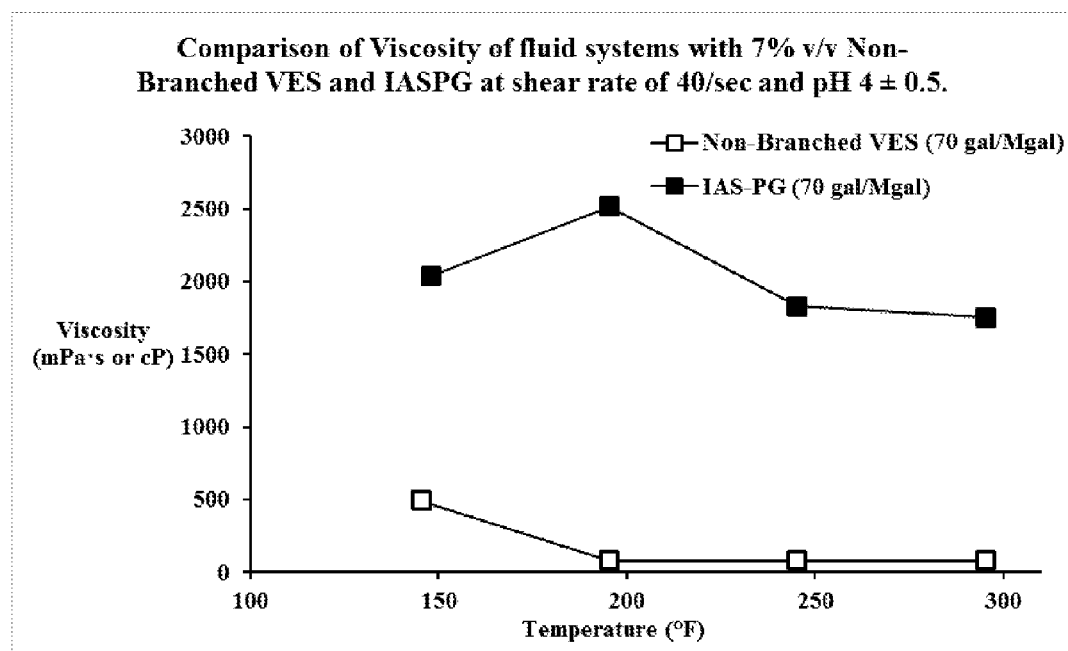
FIG. 9 is a graphical comparison of viscosity of spent acid with 7% v/v (70 gal/Mgal) IAS-PG and non-branched VES.

The viscosity of spent acid fluid increased with increase in concentration of non-branched VES up to 7% v/v (70 gal/Mgal) (FIG. 5). This is because the higher concentration of surfactant forced the molecules to go into rod-shaped micelles rather than spherical micelles. In general, surfactant molecules form different shapes of aggregation sequentially from spherical to rod and then vesicles with increasing concentration. It was found that viscosity of VES fluid was lower at 10% v/v (100 gal/Mgal) non-branched VES at higher temperatures. It can be due to formation of vesicles. Using higher amount of the non-branched VES is not desirable from commercial point of view.

TABLE 1

Viscosity of non-branched VES fluid in simulated spent acid (18% $MgCl_2$ + 18% $CaCl_2$, pH adjusted to 4.0) at variable temperatures.

| Fluid System | Temperature | Apparent Viscosity, mPa · s or cP | | |
|---|---|---|---|---|
| | | 40/sec | 100/sec | 170/sec |
| non-branched VES 5% v/v (50 gal/Mgal) | 66° C. (150° F.) | 298 | 226 | 153 |
| | 93° C. (200° F.) | 86 | 59 | 46 |
| | 121° C. (250° F.) | 54 | 21 | 13 |
| | 150° C. (300° F.) | 50 | 20 | 12 |
| non-branched VES 7% v/v (70 gal/Mgal) | 66° C. (150° F.) | 491 | 280 | 170 |
| | 93° C. (200° F.) | 77 | 32 | 20 |
| | 121° C. (250° F.) | 78 | 31 | 19 |
| | 150° C. (300° F.) | 77 | 31 | 19 |
| non-branched VES 10% v/v (70 gal/Mgal) | 66° C. (150° F.) | 536 | 448 | 334 |
| | 93° C. (200° F.) | 104 | 85 | 70 |
| | 121° C. (250° F.) | 52 | 35 | 26 |
| | 150° C. (300° F.) | 46 | 20 | 14 |

Rheology of Spent Acid with Branched VES at High Temperatures

The chemical structure of the surfactant is one of the major factors that affect the aggregation behaviors and thereby influencing rheological properties of the fluid. The chemical structure of surfactant molecule can be modified to enhance the hydrogen bonding in the polar group and hydrocarbon chain interaction. The new surfactant SCHERCOQUAT™ IAS-PG from Lubrizol Advanced Materials, Inc., Ohio, was tested as a VES as alternative to non-branched VES. This product is a mixture of isostearamidopropyl ethyldimonium ethosulfate (CAS 67633-63-0) and propylene glycol (the mixture abbreviated as "IAS-PG").

The VES fluid with the branched VES (IAS-PG) showed better rheology profile than non-branched VES 5% v/v (50 gal/Mgal) or 7% v/ (70 gal/Mgal) concentration up to 150° C. (300° F.) (Table 2, FIG. 6, FIG. 7, FIG. 8, and FIG. 9). The gelling properties of non-branched VES can also be modified by partially replacing the non-branched VES with SCHERCOQUAT™ IAS-PG. The improved viscosifying effect of IAS-PG was due to presence of branching in the hydrophobic part of the surfactant and the presence of ethosulfate as organic counter ion.

TABLE 2

Viscosity of branched VES fluid (with SCHERCOQUAT ™ IAS-PG) in simulated spent acid (18% $MgCl_2$ + 18% $CaCl_2$, pH adjusted to 4.0) at variable temperatures.

| VES Fluid | Temperature | Apparent Viscosity, mPa · s or cP | | |
|---|---|---|---|---|
| | | 40/sec | 100/sec | 170/sec |
| IAS-PG 5% v/v (50 gal/Mgal) | 66° C. (150° F.) | 503 | 258 | 180 |
| | 93° C. (200° F.) | 547 | 294 | 187 |
| | 121° C. (250° F.) | 80 | 65 | 44 |
| | 150° C. (300° F.) | 32 | 13 | 8 |
| IAS-PG 7% v/v (70 gal/Mgal) | 66° C. (150° F.) | 2039 | 869 | 568 |
| | 93° C. (200° F.) | 2516 | 1100 | 671 |
| | 121° C. (250° F.) | 1831 | 776 | 481 |
| | 150° C. (300° F.) | 1753 | 701 | 413 |
| non-branched VES 4% v/v (40 gal/Mgal) + IAS-PG 3% v/v (30 gal/Mgal) | 66° C. (150° F.) | 1619 | 707 | 432 |
| | 93° C. (200° F.) | 708 | 305 | 192 |
| | 121° C. (250° F.) | 656 | 264 | 155 |
| | 150° C. (300° F.) | 655 | 266 | 155 |

Table 1 and Table 2 compare the viscosifying effect of non-branched VES and SCHERCOQUAT™ IAS-PG at 7% and 5% in absence of corrosion inhibitor system.

Effect of Corrosion Inhibitor

A VES can be used to increase the viscosity of an acid treatment fluid as it spends against a formation to divert the fluid in the matrix of a formation. A corrosion inhibitor needs to be included in the live acid to avoid corrosion of tubulars in the well caused by contact with the acidic fluid as it is introduced through the wellbore into a subterranean formation.

However, the addition of corrosion inhibitors such as the formulated corrosion inhibitor used in these examples lowers the viscosity of the VES fluid (Table 3). The same trend was observed for a non-branched VES such as SCHERCOQUAT™ IAS-PG.

TABLE 3

Viscosity of non-branched VES fluid in presence of corrosion inhibitors in simulated spent acid (18% $MgCl_2$ + 18% $CaCl_2$, pH adjusted to 4.0) at variable temperatures

| VES Fluid (spent) | Temperature | Apparent Viscosity, mPa · s or cP | | |
|---|---|---|---|---|
| | | 40/sec | 100/sec | 170/sec |
| non-branched VES 7% v/v (70 gal/Mgal) + formulated corrosion inhibitor 2% v/v (20 gal/Mgal) | 66° C. (150° F.) | 42 | 43 | 27 |
| | 93° C. (200° F.) | 8 | 3 | 2 |
| | 121° C. (250° F.) | 4 | 2 | 1 |
| IAS-PG 7% v/v (70 gal/Mgal) + formulated corrosion inhibitor 2% v/v (20 gal/Mgal) | 66° C. (150° F.) | 145 | 132 | 118 |
| | 93° C. (200° F.) | 41 | 39 | 34 |
| | 121° C. (250° F.) | 17 | 7 | 4 |
| | 150° C. (300° F.) | 14 | 7 | 6 |
| IAS-PG 5% v/v (50 gal/Mgal) + formulated corrosion inhibitor 0.5% v/v (5 gal/Mgal) | 66° C. (150° F.) | 541 | 249 | 165 |
| | 93° C. (200° F.) | 139 | 129 | 103 |
| | 121° C. (250° F.) | 13 | 5 | 3 |
| | 150° C. (300° F.) | 11 | 4 | 3 |

Without being limited by any theory, it is believed that the aggregation of surfactants is affected by factors such as presence of water insoluble materials and other surfactants. The formulated corrosion inhibitor contains cinnamaldehyde, which is water insoluble and aids the formation of spherical micelles with cinnamaldehyde at the center. The ethoxylated nonionic surfactant in the formulated corrosion inhibitor also interferes in the formation of rod-shaped micelles. The third factor responsible for reduction in viscosity is the presence of quaternary quinolinium chloride salt which also interferes with the action of cationic surfactant as a VES.

A lower amount of corrosion inhibitor will give lower interference in gel formation at particular temperature. The corrosion test results of VES fluid containing formulated corrosion inhibitor is shown in Table 4. The test data indicated that 0.5% v/v (5 gal/Mgal) of formulated corrosion inhibitor is sufficient to inhibit the corrosion at 93° C. (200° F.), whereas at least 1% v/v (10 gal/Mgal) of formulated corrosion inhibitor is required to inhibit the corrosion at 107° C. (225° F.).

A corrosion inhibitor intensifier (e.g., formic acid) was required to pass the corrosion test at 93° C. (200° F.) and at 107° C. (225° F.) with 0.5%/0.7% of the formulated corrosion inhibitor.

TABLE 4

Corrosion test results for VES fluids in 20% acid using P-110 coupons at various temperatures

| HCl (% w/w) | VES | Formulated corrosion inhibitor (gal/Mgal) | Corrosion inhibitor intensifier (gal/Mgal) | Temperature | Time (hours) | Corrosion Loss (lb/ft2) |
|---|---|---|---|---|---|---|
| 20 | non-branched VES 5% v/v (50 gal/Mgal) | 5 | 10 | 93° C. (200° F.) | 2 | 0.023 |
|  |  | 5 | 10 | 93° C. (200° F.) | 3 | 0.056 |
|  | IAS-PG 5% v/v (50 gal/Mgal) | 5 | 5 | 93° C. (200° F.) | 3 | 0.2 |
|  |  | 5 | 10 | 93° C. (200° F.) | 3 | 0.10 |
|  |  | 7 | 5 | 93° C. (200° F.) | 3 | 0.037 |
|  |  | 7 | 10 | 93° C. (200° F.) | 3 | 0.037 |
|  | non-branched VES 5% v/v (50 gal/Mgal) | 10 | 10 | 107° C. (225° F.) | 2 | 0.049 |
|  |  | 7 | 10 | 107° C. (225° F.) | 2 | 0.103 |
|  | IAS-PG 5% v/v (50 gal/Mgal) | 7 | No Additive | 107° C. (225° F.) | 2 | 0.154 |
|  |  |  | 10 | 107° C. (225° F.) | 2 | 0.101 |

The viscosity of the VES fluids with formulated corrosion inhibitor is also measured at lower shear rate, that is, shear rate of 5/sec (Table 5). The non-branched VES 5% v/v (50 gal/Mgal) and the formulated corrosion inhibitor 0.5% v/v (5 gal/Mgal) with corrosion inhibitor intensifier 1% v/v (10 gal/Mgal) showed good viscosity at 93° C. (200° F.), but the same formulation cannot be used for 107° C. (225° F.). SCHERCOQUAT™ IAS-PG 5% v/v (50 gal/Mgal) showed moderate viscosity at 107° C. (225° F.) in presence of formulated corrosion inhibitor 0.7% v/v (7 gal/Mgal) but that amount is not sufficient to inhibit the rate of corrosion at 107° C. (225° F.) (Table 4, above).

TABLE 5 non-branched VES or branched VES (IAS-PG) in simulated spent acid (18% MgCl₂, 18% CaCl₂, pH adjusted to 4.0) solution with corrosion inhibitor at shear rate of 5/sec

| VES | Formulated corrosion inhibitor (gal/Mgal) | Intensifier | Viscosity (mPa · s or cP) at shear rate of 5/sec | |
|---|---|---|---|---|
|  |  |  | 107° C. (225° F.) | 121° C. (250° F.) |
| non-branched VES 5% v/v (50 gal/Mgal) | 0 | None | 115.8 | 89.0 |
|  | 5 | None | 53.4 | 53.9 |
|  | 5 | 1.8% Potassium formate | 57.6 | Not Determined |
|  | 5 | 0.5% formic acid | 61.1 | 51.5 |
|  | 7 | None | 30.2 | 17.3 |
|  | 7 | 1.8% Potassium formate | 20.2 | Not Determined |
| IAS-PG 5% v/v (50 gal/Mgal) | 0 | None | 348.6 | 271.6 |
|  | 5 | None | 73.9 | 44.5 |
|  | 5 | 1.8% Potassium formate | 75.7 | Not Determined |
|  | 7 | 1.8% Potassium formate | 57.8 | Not Determined |
|  | 10 | None | 47.5 | 21.6 |

Table 5 compares the viscosifying effect of non-branched VES and SCHERCOQUAT™ IAS-PG branched VES in the presence of the formulated corrosion inhibitor and the intensifier. As the corrosion inhibitor intensifier is formic acid, potassium formate salt was used in molar amount equivalent to 10 gpt corrosion inhibitor intensifier.

The higher temperature of 107° C. (225° F.) requires higher corrosion inhibition system in the VES fluid to avoid corrosion during pumping the fluid in the reservoir. But the addition of corrosion inhibitor also results in the thinning of the VES fluids. At the same time, there is need of better inhibition system to counteract effect of corrosion at higher temperature. The compatibility of corrosion inhibitor with VES fluid is also important. The current VES fluid system retained the viscosity up to 107° C. (225° F.) after incorporation of a suitable corrosion inhibitor (Table 5). The same system also passes the corrosion test in live acid (20% HCl w/) with the same corrosion inhibitor (Table 4).

Applications

The above system can be used as a diverting agent in acid stimulation of carbonate reservoir with a design temperature up to 107° C. (225° F.). The system can be used with acid strength up to 20% HCl without any further modifications.

Without other additives, the fluid system retains it viscosity up to at least 150° C. (300° F.) in spent acid.

With a corrosion inhibitor, the system retains its viscosity up to at least 107° C. (225° F.). The VES system with corrosion inhibitor system passes the corrosion test at 107° C. (225° F.) in live acid containing 20% HCl w/w. This is the first VES fluid system which passes the corrosion as well as rheology test at 107° C. (225° F.).

A branched surfactant is more effective as a VES in acid stimulation than a non-branched VES.

With incorporation of corrosion inhibitor, the fluid system passes rheology requirements and corrosion requirements. Hence, the system can be used without any further modifications. This is the first VES fluid system that passes both rheology requirements and the corrosion requirements up to at least 107° C. (225° F.). Thus, the fluid system can meet market demand for the usage of VES fluids for acid diversion in acidizing operations up to at least 107° C. (225° F.).

The present invention can be useful as a VES or acid diverting agent in acidizing operations for carbonate reservoirs up to 107° C. (225° F.) with acid strength up to 20%.

The invention is targeted to the acidizing in carbonate formations. But it is contemplated that the branched VES can be useful in acidizing of sandstone formations depending upon the job requirements.

Conclusion

Therefore, the present invention is well adapted to attain the ends and advantages mentioned as well as those that are inherent therein.

The exemplary chemicals or fluids disclosed herein may directly or indirectly affect one or more components or pieces of equipment associated with the preparation, delivery, recapture, recycling, reuse, or disposal of the disclosed chemicals or fluids. For example, the disclosed chemicals or fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary chemicals or fluids. The disclosed chemicals or fluids may also directly or indirectly affect any transport or delivery equipment used to convey the chemicals or fluids to a well site or downhole such as, for example, any transport vessels, conduits, pipelines, trucks, tubulars, or pipes used to fluidically move the chemicals or fluids from one location to another, any pumps, compressors, or motors (e.g., topside or downhole) used to drive the chemicals or fluids into motion, any valves or related joints used to regulate the pressure or flow rate of the chemicals or fluids, and any sensors (i.e., pressure and temperature), gauges, or combinations thereof, and the like. The disclosed chemicals or fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of treating a zone of a subterranean formation penetrated by a wellbore, the method comprising the steps of:
    (A) forming a treatment fluid comprising:
        (i) water;
        (ii) strong acid; and
        (iii) a branched viscoelastic surfactant having a hydrophobic portion with a total of 16 to 20 carbons;
        wherein the treatment fluid has an initial pH of less than 0.5; and
        wherein the treatment fluid has a viscosity of less than 5 cP at 40 sec$^{-1}$ at the initial pH;
    (B) introducing the treatment fluid through the wellbore into the zone; and
    (C) allowing time for the strong acid in the treatment fluid to spend in the formation.

2. The method according to claim 1, wherein the strong acid comprises hydrochloric acid.

3. The method according to claim 1, wherein the treatment fluid does not include hydrogen fluoride.

4. The method according to claim 1, wherein the branched viscoelastic surfactant comprises a viscoelastic surfactant having a nitrogen atom with short chain alkyl groups.

5. The method according to claim 1, wherein the branched viscoelastic surfactant comprises a quaternary of a branched fatty acid substituted amidoamine.

6. The method according to claim 5, wherein the branched viscoelastic surfactant comprises N-Ethyl-N ,N-Dimethyl-[(3-Oxoisooctadecyl)Amino]-1-Propanaminium Ethyl Sulfate.

7. The method according to claim 6, wherein the zone has a design temperature of higher than 93° C. (200° F.).

8. The method according to claim 1, wherein the zone has a design temperature of higher than 93° C. (200° F.).

9. The method according to claim 1, wherein the treatment fluid additionally comprises: a corrosion inhibitor.

10. The method according to claim 9, wherein the corrosion inhibitor is selected from the group consisting of: an aldehyde, quaternary quinolinium, and any combination thereof.

11. The method according to claim 9, wherein the treatment fluid additionally comprises: a corrosion inhibitor intensifier.

12. The method according to claim 11, wherein the corrosion inhibitor intensifier comprises formic acid.

13. The method according to claim 11, wherein the zone has a design temperature of up to 107° C. (225° F.).

14. The method according to claim 1, further comprising the step of: flowing back fluid from the zone.

* * * * *